No. 783,035. PATENTED FEB. 21, 1905.
F. A. GERLING.
DRAFT APPLIANCE.
APPLICATION FILED JUNE 7, 1904.
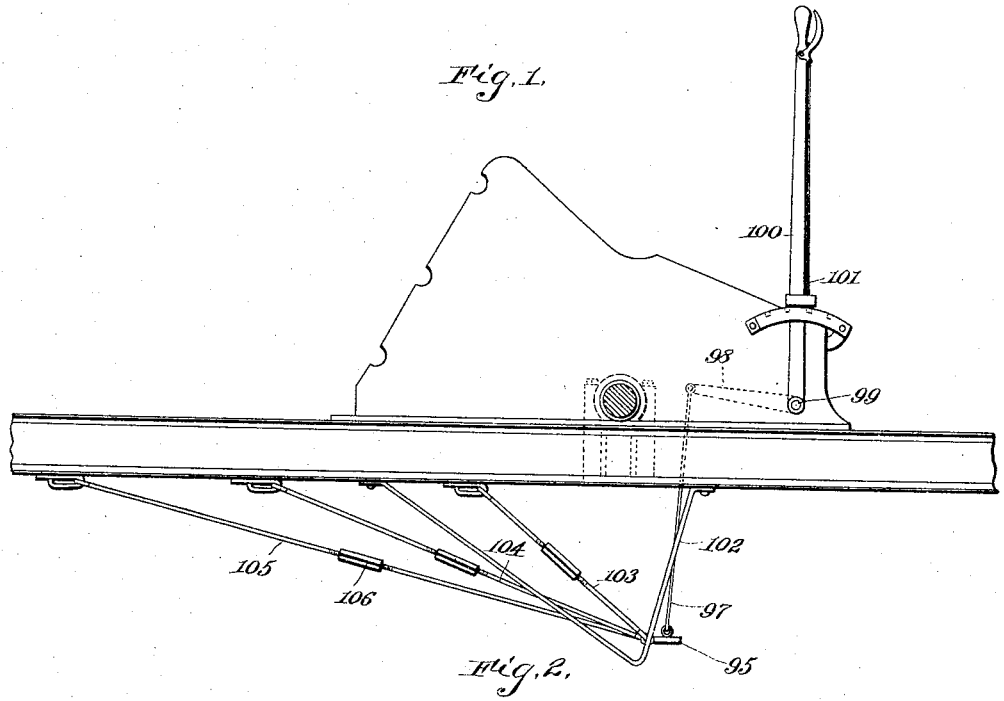
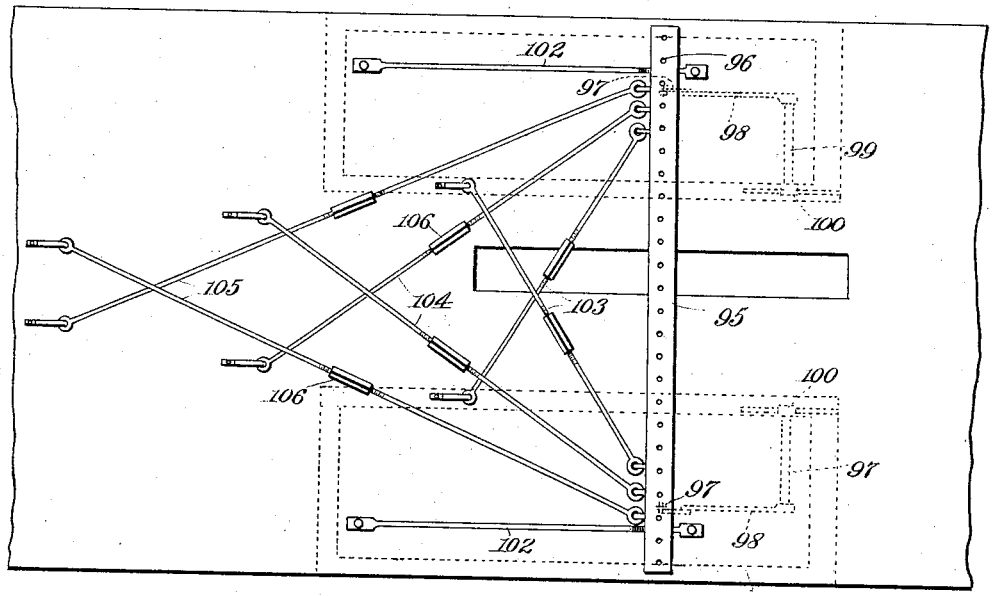
Witnesses  Fred A. Gerling, Inventor.

No. 783,035. Patented February 21, 1905.

UNITED STATES PATENT OFFICE.

FRED AUGUST GERLING, OF PORTLAND, OREGON.

DRAFT APPLIANCE.

SPECIFICATION forming part of Letters Patent No. 783,035, dated February 21, 1905.

Application filed June 7, 1904. Serial No. 211,520.

*To all whom it may concern:*

Be it known that I, FRED AUGUST GERLING, a citizen of the United States, residing at Portland, in the county of Multnomah and State of Oregon, have invented a new and useful Draft Appliance, of which the following is a specification.

This invention relates to draft appliances for vehicles, and has for its principal object to provide a draft appliance for use in connection with traction-engines and other self-propelling vehicles that are used for traction purposes, especially in the hauling of agricultural machinery and for other purposes where draft-animals are usually employed.

A further object of the invention is to provide a draft appliance in which the point of application of the load may be adjusted in accordance with conditions, and the draft-point changed so that the power of the engine may be utilized to the best advantage on different grades.

With these and other objects in view, as will more fully hereinafter appear, the invention consists in the novel construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a side elevation of a portion of a traction-engine provided with a draft appliance constructed in accordance with the invention. Fig. 2 is an inverted plan view of the same.

Similar numerals of reference are employed to indicate corresponding parts throughout both figures of the drawings.

The apparatus forming the subject of the present invention is designed for use in connection with traction or other engines which are generally employed for moving agricultural machines, for the hauling of logs or loads of different character where draft-animals are generally used, and in the drawings there is shown a traction-engine propelled by an internal-combustion engine, this being used merely as typical of a hauling-machine to which the invention may be applied, it being understood that the improved draft appliance may be used in connection with any form of traction-engine or self-propelling vehicles.

The draft-bar 95 extends transversely of the vehicle at a point below the main frame and is provided with a large number of openings 96 for convenience in securing the pins or bolts of the connecting-bars or similar devices to which the agricultural machine or other article is secured. At or near the opposite ends of the draft-bar are eyebolts, to which are connected the lower ends of links 97, the upper ends of which are connected to rocker-arms 98, carried by rock-shafts 99. To each rock-shaft 99 is secured an adjusting-lever 100, having a latch-bar 101 of any ordinary construction, so that the adjusting-levers may be locked in any desired position. This permits of the raising and lowering of the draft-bar, and said bars may be maintained in a horizontal position or may be disposed at an oblique angle, if desired, each end of the bar being adjusted independently of the opposite end, and said adjustment is at times found useful when the traction-engine is used on rolling land for miscellaneous work.

In order to prevent the draw-bar from moving forward when the engine is traveling downhill and the weight of the load tends to move the bar toward the front of the machine, a number of braces 102 are employed, these braces being formed of cast metal and secured to the frame of the machine in such manner that the draw-bar will bear against them when thrust forward.

The grade of the land on which the traction-engine is used is often of such character that the whole weight of the engine cannot be properly utilized for hauling purposes, and to overcome this difficulty provision has been made for adjusting the point of application of the load in accordance with the conditions. For this purpose the draft-bar is connected to the under side of the frame of the machine by means of a plurality of sets of tension-bars 103, 104, and 105, the number of sets of bars being increased or diminished in accordance with the size of the machine and the purpose for which it is intended. Each of the tension-bars is made in two sections and the sections are connected together by an adjustable nut 106. Where the grade is severe, it is advisable to apply the load near the front of the machine, and for this purpose the adjusting-nuts of the tensions-arms 103 are tightened and the nuts of the remaining bars are loosened, so that the load will be near the front of the machine and the weight of the latter can be utilized to better advantage in hauling. On comparatively level ground it may be desirable to transfer the draft-point toward the rear, and for this purpose the nuts of one of the rear sets of tension-bars are tightened and those of the other bars loosened, and in this manner the point of application of the load may be transferred in accordance with the grade or weight and character of the load to be hauled.

Having thus described the invention, what is claimed is—

1. In draft mechanisms, a vehicle, a draw-bar, and a plurality of independently-adjustable tension members connected to the draw-bar at one end, and at their opposite ends being connected, respectively, to different points in the length of the vehicle.

2. In draft mechanism for vehicles including a draw-bar extending transversely of the vehicle, and a plurality of independently-adjustable tension-bars connected to the draw-bar of the vehicle and serving to change the point of application of the load.

3. In draft mechanism for vehicles, a draw-bar, a plurality of sectional tension-bars connected to the draw-bar at one end, the opposite ends of said tension-bars being connected, respectively, at different points in the length of the vehicle, whereby adjustment of one or more sets of tension-bars will transfer the point of application of the load or distribute the same to different points in the length of the vehicle.

4. The combination with a vehicle, of a transversely-disposed draw-bar, and a plurality of sets of tension-bars of different length, respectively, said bars being connected at one end to the vehicle and at the opposite end to the draw-bars, and each of said arms being formed of a plurality of sections having an adjustable connecting member.

5. The combination with a vehicle, of a draw-bar extending transversely thereof, and independent adjusting devices connected to the opposite ends of said draw-bar.

6. The combination with a vehicle, of a draw-bar extending transversely thereof and provided with a plurality of perforations, adjusting-levers carried by the vehicle and having independent linked connections with the opposite ends of said draw-bar, and tension members connected to the draw-bar for transferring the load on the draw-bar to the vehicle.

7. The combination with a vehicle, of a transversely-extending draw-bar, a plurality of braces carried by the vehicle, and serving to engage the front of the draw-bar and limit the forward movement thereof.

In testimony that I claim the foregoing as my own I have hereto affixed my signature in the presence of two witnesses.

FRED AUGUST GERLING.

Witnesses:
F. C. HOECKER,
W. T. BURNEY.